United States Patent [19]

Adiletta

[11] Patent Number: 4,495,238
[45] Date of Patent: Jan. 22, 1985

[54] FIRE RESISTANT THERMAL INSULATING STRUCTURE AND GARMENTS PRODUCED THEREFROM

[75] Inventor: Joseph G. Adiletta, Thompson, Conn.

[73] Assignee: Pall Corporation, Glen Cove, N.Y.

[21] Appl. No.: 542,025

[22] Filed: Oct. 14, 1983

[51] Int. Cl.³ .............................................. B32B 5/16
[52] U.S. Cl. .................................. 428/215; 428/236; 428/284; 428/285; 428/286; 428/287; 428/288; 428/903; 428/920; 428/921
[58] Field of Search .............. 428/215, 236, 284, 285, 428/286, 287, 288, 903, 920, 921

[56] References Cited

U.S. PATENT DOCUMENTS

| | | |
|---|---|---|
| 2,709,667 | 5/1955 | Grubb et al. |
| 3,489,148 | 1/1970 | Duncan et al. ...................... 128/284 |
| 3,572,397 | 3/1971 | Austin ................................... 139/426 |
| 3,575,899 | 4/1971 | Pryor et al. ......................... 260/17.4 |
| 3,744,534 | 7/1973 | Henry et al. ....................... 139/426 |
| 3,746,679 | 7/1973 | Seipel ................................. 260/29.6 |
| 3,824,126 | 7/1974 | Katsushima et al. .............. 260/296 |
| 3,950,588 | 4/1976 | McDougal .......................... 428/233 |
| 3,974,314 | 8/1976 | Fuchs ................................. 428/212 |
| 4,058,647 | 11/1977 | Inoue et al. ........................ 428/474 |
| 4,097,297 | 1/1978 | Keene ................................. 106/177 |
| 4,135,029 | 1/1979 | Pfeffer ............................... 428/284 |
| 4,246,313 | 1/1981 | Stengle .............................. 428/266 |
| 4,255,483 | 3/1981 | Byrd et al. ........................ 428/245 |
| 4,255,817 | 3/1981 | Heim ..................................... 2/2 |
| 4,321,404 | 3/1982 | Williams et al. .................... 560/115 |

OTHER PUBLICATIONS

"Vinyl Acetate/Ethylene Emulsion Copolymers", from *Paint Manufacture* Sep. 1968, pp. 30-36.

Primary Examiner—Marion E. McCamish
Attorney, Agent, or Firm—Leydig, Voit, Osann, Mayer and Holt, Ltd.

[57] ABSTRACT

Fire resistant thermal insulating composite structures, particularly garments, comprised of a mixture of from about 50 to about 94 percent by weight of inorganic microfibers, particularly glass, and about 50 to about 6 percent by weight of a heat resistant binding agent. The structures are porous, allowing them to breath. The structures are also flexible and pliant and have a Thermal Resistance of at least about 25 seconds.

20 Claims, 1 Drawing Figure

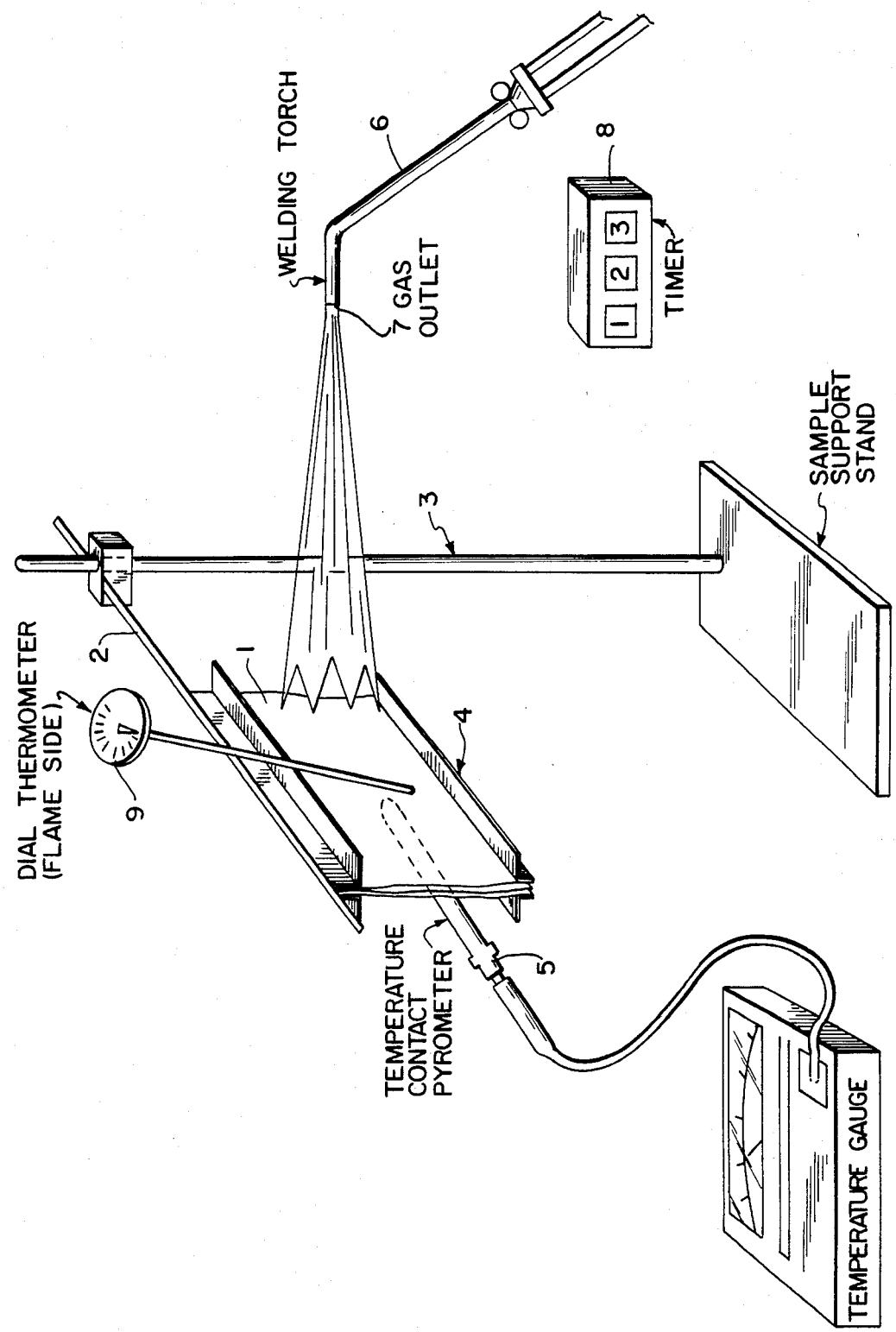

FIRE RESISTANT THERMAL INSULATING STRUCTURE AND GARMENTS PRODUCED THEREFROM

TECHNICAL FIELD

This invention relates to a composite structure and articles produced therefrom which provide both fire resistance and thermal insulation.

BACKGROUND ART

A variety of materials are available which provide a significant degree of fire resistance, among which are some that also are pliant or flexible. In some applications, e.g., fire fighters' uniforms, ironing board covers and gloves used for handling hot materials, this latter property is of considerable importance. That is, to function effectively in these applications, such a material must be capable of conforming to the shape of the object or body over which it is placed and, in the case of garments or gloves, it must be capable of being bent or flexed in use while maintaining its integrity or fire resistance.

With some applications, fire resistance is not sufficient; protection against high temperatures is also critical. For example, fire fighters are routinely exposed to both fire and high temperature situations. In other instances, such as with race car drivers, jet fighter pilots and the like, there is the risk of exposure to fire and heat, albeit it is not routine. With this type of application, any material intended for protection of the wearer must provide not only protection against fire but must also adequately protect its wearer from the disabling and even fatal effects of prolonged exposure to the heat of the fire.

Additionally, the material or garment must maintain its integrity in use. That is, the structure must be resistant to tearing, degradation or wear under the operating conditions encountered. Thus, a structure having an exposed surface should, ideally, resist puncturing, tearing, abrasion or flaking. Thus, at least the outer surface layer should be as durable as cloth generally used for apparel.

An additional desirable feature of such structures used in fire or high temperature environments is that the structure be porous, allowing passage of air, thereby permitting air transfer from body to ambient atmosphere, resulting in necessary cooling of body temperature to avoid heat induced stress, which can rapidly lead to physical collapse.

Numerous materials have been employed as fire resistant or insulative structures. However, none has adequately provided all of the aforementioned properties, particularly in applications for fire protective garments.

This invention, then, is directed to a composite structure providing the desirable characteristics outlined above.

DISCLOSURE OF INVENTION

The subject invention provides a porous, flexible, pliant, fire and heat resistant composite structure comprising at least one outer layer of a fire resistant fabric and at least one inner layer providing thermal insulative characteristics. The inner layer (or layers) is comprised of a mixture of from about 50 to about 94 percent by weight of inorganic microfibers, particularly glass, and about 50 to about 6 percent by weight of a heat resistant binding agent. A preferred combination is about 92 parts by weight of glass microfibers and about 8 parts by weight of the binding agent.

In one embodiment, the outer layer of the fire resistant fabric is comprised of a woven aromatic polyamide or aramid of the type available from E. I. DuPont de Nemours and Company under the trademark Nomex®. Other fabrics may also be used.

The composite structures of the subject invention are strong, light-weight and pliable. They provide fire resistance and thermal insulation while having the requisite properties with regard to structural integrity, i.e., the structures resist tearing and are abrasion and puncture resistant. The structures of this invention may also have hydrophobic and oleophobic properties as well as detergent and solvent resistance. The composite structures of the subject invention have a Thermal Resistance as defined hereinafter of at least about 25 seconds.

BRIEF DESCRIPTION OF THE DRAWING

The FIGURE is a perspective view of the test apparatus used to determine the fire and heat resistance of the composite structures of this invention.

BEST MODES FOR CARRYING OUT THE INVENTION

The heat resistant or thermal insulation portion of the composite structure of the present invention is formed from one or more layers comprised of a mixture of inorganic microfibers and a heat resistant binding agent. The layers are in the form of thin sheets comprised of a continuous matrix of the binding agent reinforced by the inorganic microfibers, the resulting structure being both porous and pliable. The inorganic microfibers are present in the formed, dry sheets in an amount in the range of from about 50 percent to about 94 percent, preferably in the range of from about 70 percent to about 92 percent and most preferably about 92 percent. (All parts and percentages expressed herein are by weight unless otherwise noted.)

The inorganic microfibers used are in the form of microfibrous staple fibers. Glass microfibers used in the present invention have an average length in the range of from about 50 to about 3,000 micrometers and diameters in the range of from about 0.4 to about 4.0 micrometers, preferably in the range of from about 0.5 to about 2.0 micrometers. The aspect ratios of the glass fibers will generally lie in the range of from about 20:1 to about 1000:1, preferably being on the order of about 100:1. Glass microfibers of this type are available from Johns Manville Corporation in various grades, e.g., grade 106 is a nominal 0.6 micrometer in diameter size with a 0.54–0.68 micrometer range, grade 104 is a nominal 0.45 micrometer size with a 0.40–0.55 micrometer range, grade 108A is a nominal 0.9 micrometer with a 0.69–1.1 micrometer range and grade 112 is a nominal 3 micrometer in diameter size with a 2.6–3.8 micrometer range. Blends of different grades can also be used to provide different distribution of sizes than any one grade provides.

Other inorganic microfibers, such as metal, alumina or potassium titanate, may also be used but are less preferred. Mixtures of inorganic microfibers, such as glass and potassium titanate, may also be used. The potassium titanate fibers typically have diameters in the range of from about 0.1 to about 0.5 micrometer. Preferably, the lengths of these fibers are in the range of from about 5 to about 25 micrometers with a preferred aspect ratio of about 50:1. A preferred mixture is about 80 percent by weight glass microfibers and about 20 percent by weight potassium titanate.

The binding agent is present in an amount in the range of from about 50 to about 6 percent, preferably in the range of from about 30 to about 8 percent, and most preferably about 8 percent.

The binding agent, to be suitable for use in the subject invention, must have the following characteristics. It must (a) hold or bind the microfibers in place, that is, provide structural integrity for the thermal insulation portion of the subject invention, (b) when combined with the microfibers, form a structure which is porous as well as pliant or flexible, allowing the composite structure to be used in applications such as clothing where bending or flexing in operation is important and where breathability is required, and (c) be able to withstand elevated temperatures for extended periods of time without undue deterioration, i.e., it must maintain its structural integrity and not become stiff or lose its pliability upon exposure to elevated temperatures. To provide the requisite porosity necessary for the structure to breath, the binder, as mixed with the microfibers prior to formation of the fibrous sheet, must be in particulate form (preferably in the form of an emulsion or latex) wherein the binder particles are less than about 1 micrometer in size, preferably less than about 0.3 micrometer.

High temperature resistant resinous materials, such as urea resins, phenolic resins, epoxies and silicates may be used, provided they meet the criteria set out above. However, many of these types of high temperature resistant resins become stiff on curing, thus lacking the degree of flexibility or pliability required. Other binders, which are not themselves fire or heat resistant, may be used if suitable fire retardants can be added and if the resin particle size is less than about 1 micrometer. The preferred binder is a heteropolymer formed from vinyl chloride monomer (providing fire resistance) and ethylene, most preferably an ethylene-vinyl chloride acrylamide terpolymer. Materials of this type are available from Air Products and Chemicals, Inc. under the trandemark Airflex ®. Particularly preferred is Airflex ®4500, an ethylene-vinyl chloride terpolymer with amide functionalities in the form of an emulsion. The solids content of this emulsion is at least about 50 weight percent and the average particle size is about 0.12 micrometer.

The heat resistant or thermal insulation portion of the composite structure of this invention is preferably formed by the following process:

The fibers are mixed with water at ambient conditions to form a dispersion or slurry. (When glass microfibers are used, the pH of the water prior to addition of the microfibers is adjusted to an acidic pH, preferably of about 5, although pHs in the range of from about 3 to about 11 may be used.)

After agitation to form a slurry or dispersion of the fibers, the heat resistant binder emulsion or latex is added. The resulting mixture, having (a) a solids content of from about 0.5 to about 20 weight percent, preferably less than about 10 weight percent, more preferably about 2 weight percent and (b) a viscosity in the range of from about 1 to about 100 centipoise at amibent conditions, preferably less than about 30, is then mixed for an extended time, preferably for from about 20 to about 60 minutes, to provide a uniform slurry. The slurry is then formed into sheet-like material by casting or spreading the dispersion onto a formaninous structure and removing water. Any suitable apparatus, most appropriately of the type used in paper forming processes, such as a headbox, may be used to cast or spread the dispersion of fibers and heat resistant binder. After removal of water, typically by draining followed by the application of a vacuum, the formed structure is dried and the binder resin cured. In the alternative, the heat resistant or thermal insulation portion of the composite structure of this invention may be formed by casting the slurry directly onto the fire resistant outer layer, such as a woven aramid fibrous structure (Nomex ®), or onto a reinforcing scrim cloth comprised of, e.g., woven glass filaments.

A preferred method for perparing the heat resistant or thermal insulation layer of this invention with the preferred fibers, i.e., glass microfibers, comprises the following steps:

(1) About 1,000 parts of water are placed in a tank and the pH of the water is adjusted to about 5 with an acid, e.g., sulfuric acid.

(2) A blend of glass microfibers having diameters between about 0.5 and 2.0 micrometers and aspect ratios on the order of 100:1 is dispersed in the tank of water in an amount such that about 1 part of glass microfibers is present to about 1,000 parts by weight of water. The glass microfibers are dispersed in the water with agitation at ambient conditions.

(3) To this dispersion is added the binder resin in the form of a water-based emulsion containing 15 percent by weight of solids of the binder resin. The binder resin emulsion is added in an amount such that the solids content of the emulsion, i.e., the weight of the binding agent, is about 1 part by weight to 10 parts by weight of the glass microfibers present, that is, the ratio of the binder resin solids to glass microfibers is about 1:10.

(4) After agitation for an extended time, e.g., circa 40 minutes, to provide uniform dispersion of the components, the dispersion is spread or cast on a foraminous surface and water is removed by free drainage for about 2 seconds followed by the application of a vacuum. The resulting sheet structure is then passed through a dryer at a temperature of from about 220 to 350 degrees F., preferably about 300 degrees F., over about 2 minutes. The resulting porous, sheet material, in the form of a continuous matrix of the binding agent reinforced by the glass microfibers, can then be used in this form, or in the form of multiple layers, as the porous, heat resistant or thermal insulation portion of the composite structure of the subject invention.

If desired, the heat resistant or thermal insulation layer(s) may be rendered hydrophobic and oleophobic, as well as resistant to solvents and detergents, by a post-treatment of the formed structure with an appropriate treating agent. Alternatively, as discussed below, the treating agent may be combined with the microfibers and binding agent in the slurry prior to laydown and formation of the thermal insulation sheet material. While simplifying the process of manufacture, it has been found that the post-treatment of the formed heat resistant or thermal insulation layer with the surface tension modifying treating agent provides a more desirable structure with enhanced properties of oleophobicity, hydrophobicity, detergent resistance and solvent resistance. Accordingly, the post-treatment technique, as described hereinafter, is preferred.

Herein, the following terms have the meanings as set out below:

Hydrophobic: As used herein, this term refers to the ability to shed water, i.e., the material does not become wetted with water and water does not penetrate the structure of the material. The following test is used to characterize materials used in this invention as being hydrophobic: a square of the material, about five inches on a side, is positioned at a 45 degree angle to the horizontal and 5 drops of water from an eye dropper are dropped onto the surface of the material from a height of about six inches. If the water droplets roll off the surface and do not penetrate or wet the structure, that structure is defined as hydrophobic for purposes of this invention.

Oleophobic: As used herein, this term refers to the ability to shed an oil-based composition, i.e., the material does not become wetted with the oil-based composition nor does it penetrate the structure of the material. The same test as that described above for hydrophobicity, except that 5 drops of mineral oil are substituted for the water drops, is used to characterize material used in this invention as oleophobic. If the mineral oil drops agglomerate but do not wet or penetrate the surface of the structure, the material is defined as oleophobic for purposes of this invention.

Detergent Resistant: As used herein, this term refers to the ability to shed a detergent-based composition, i.e., the material does not become wetted with the detergent-based composition nor does it penetrate the structure of the material. The same test as that described above for oleophobicity, except that 5 drops of a water-based detergent composition, such as Tween 20, a polyoxyethylene sorbitan monolaurate available from Atlas Powder Company, (at a concentration of 20 weight percent in water) are substituted for the water drops, is used to characterize material used in this invention as detergent resistant. If the detergent collects but does not wet or penetrate the surface of the structure, the material is defined as detergent resistant for purposes of this invention.

Solvent Resistant: As used herein, this term refers to the ability to shed a solvent-based composition, i.e., the material does not become wetted with the solvent-based composition nor does it penetrate the structure of the material. The same test as that described above for oleophobicity, except that 5 drops of a 20 percent solution of isopropyl alcohol in water are substituted for the water drops, is used to characterize material used in this invention as solvent resistant. If the solvent rolls off and does not wet or penetrate the surface of the structure, the material is defined as solvent resistant for purposes of this invention.

The treating agent used to render the composite structures of this invention oleophobic and hydrophobic as well as to preferably provide detergent and solvent resistance can be any treating agent which imparts the requisite properties as determined by the tests set out below. The preferred fluorochemicals can have varied chemical structures. See for example, U.S. Pat. No. 3,489,148 and the patents cited therein at column 4. Particularly preferred compositions contain perfluorinated fluorochemicals. These types of materials are available from Minnesota Mining and Manufacturing Company under the designations FC-807, FC-809 and FC-824. The actives in FC-807 and FC-809 are described in detail in the Federal Register, Volume 37, Number 96, at pages 9762-9763. Specifically, they are liquid based compositions containing as the active solids a minimum of about 40 percent of ammonium bis(N-ethyl-2-perfluoroalkylsulfonamido ethyl) phosphates, wherein the alkyl group is more than 95 percent $C_8$ and the fluorine content is from 50.2 to 52.8 percent by weight. FC-824 is a perfluoroacrylate copolymer. These treating materials are preferably applied in the form of a dilute mixture comprising, e.g., 7 parts by volume of water, 0.5 parts by volume of diethylene glycol monobutyl ether (available from Union Carbide Corporation under the trademark Butyl Carbitol ®) as a fugitive wetting agent and 2.5 parts by volume of the fluorochemical treating agent (which typically will contain 40 percent by weight solids or more. The 2.5 parts by volume referred to above is based on the total volume of the fluorochemical treating agent, e.g., FC-824, as received from the maufacturer). To prepare the dilute treating mixture, the water and n-butyl alcohol should be premixed and the fluorochemical treating agent slowly added to this first mixture with mixing.

After the heat resistant or thermal insulating portion of the structure has been treated, e.g., by spraying or roller coating the dilute treating agent onto the structure, it is then dried, preferably at about 250 degrees F.

Suitable materials for the fire resistant outer layer include fabrics formed from aromatic polyamides such as those which are produced by combining one of the meta- or para-isomers or phenylenediamine with one of the meta- or para-isomers of phthaloyl (isophthaloyl or terephthaloyl) chloride. Preferred fabrics are woven from yarns such as those of the aforementioned Nomex ®. The fabric basis weight is generally in the range of about 2 to 4 ounces/square yard. The fire resistant fabric is preferably used as a single outer layer. Each layer preferably has a thickness of about 10 to about 20 mils, a preferred fabric having a thickness of about 15 mils. Surprisingly, other fabric materials, which normally would not be considered to have flame resistance, have been found to provide relatively good protection against fire when used in conjunction as a pre-laminated composite with the heat resistant or thermal insulation structure of this invention. For instance, a relatively heavy grade of conventional cotton fabric has been found useful, albeit some charring of the cotton outer fabric has been found after exposure under the conditions set out in the Fire and Heat Resistance Test described below. The cotton fabric does not, however, support combustion when the flame is removed.

Depending upon the ultimate use of the composite structure of the instant invention, layers of fire resistant fabric may be applied to one or both sides of the thermal insulation layer or layers and secured thereto by stitching and/or adhesion, particularly at their outer edges, with a suitable flexible, heat and fire resistant adhesive, such as a room temperature vulcanizing silicon rubber.

Depending upon the ultimate use of the heat and fire resistant composite structure, a suitable thickness of insulating layer is preferably in the range of about 8 to about 60 mils. The preferred thickness of each layer is about 20 mils. The number of layers is dependent on the amount of thermal protection required, the more protection needed, the greater the number of layers. Typically, 1 to 4 layers are used. For some appliations, where flexibility is not as important and increased thermal insulation is critical, additional layers, e.g., up to as many as 8 or more layers, may be used.

The thermal insulating layers of this invention have relatively low density due to the trapped air present. Typically, the densities range from about 9 to about 15 pounds/cubic foot of material.

The heat resistant or thermal insulation portion of the composite structure of this invention is, as previously mentioned, porous. This porosity, which as discussed above permits air transfer and requisite cooling of a person wearing a garment comprised of the structure, results from the combination of the microfibers with the binder resin. By appropriate selection and blending of the microfibers and the binder resin within the parameters discussed above, the heat resistant or thermal insulation portion of the composite structure can be tailored to have porosities within the acceptable range of from about 0.01 to about 20 cubic feet of air per square foot of surface area per minute (measured at a pressure of 0.5 inches WC (water column or water gauge where 27.6 inches WC equals 1 psi) and a temperature of 50 degrees C.), preferably about 0.1 cubic feet per square foot. Pore sizes of the heat resistant or thermal insulation portion are 100 micrometers or less, more preferably 10 micrometers or less, and most preferably are on the order of 0.1 micrometer or less.

The composite structures of this invention comprise at least one outer layer of a fire resistant fabric and one or more layers of the heat resistant or thermal insulation material. The composite structure will have a total thickness generally within the range of from about 30 to about 100 mils. Since the fire resistant fabric layer is typically highly porous in relation to the heat resistant or thermal insulation portion, the porosity of the composite structure is, in general, substantially the same as that of the thermal insulation portion, i.e., from about 0.01 to about 10 cubic feet of air per square foot at 0.5 inches WC and a temperature of 50 degrees C.

FIRE AND HEAT RESISTANCE TEST

Referring to the drawing, the composite structure of the subject invention is tested for its fire and heat resistance by vertically suspending an 8 inch by 10 inch rectangular sample 1 from an overhead supporting arm 2 extending from a support stand 3 with the bottom portion of the sample (one of the ten inch long edges) weighted with an elongated clamp 4 attached thereto and running the full length of the bottom edge to secure the sample against movement under the pressure exerted by the welding torch flame.

To measure the insulation characteristics of the sample, a contact pyrometer 5 is placed in contact with the sample 1 on the side away from the flame, as shown in the drawing. Upon initiation of the test, (1) an oxy-acetylene welding torch 6 generating a flame with a temperature of about 5,000 degrees F. is mounted with the gas outlet 7 of the welding torch at a distance of 12 inches from the side of the sample having the flame resistant fabric thereon and with the flame directed at the fire resistant surface of the sample and (2) a timer 8 is started. The time required for the temperature on the opposite or protected side of the fabric to reach 120 degrees F., as dertermined by the contact pyrometer 5, is determined. A dial thermometer 9 is used to measure the temperature on the side of the structure facing the flame. When the temperature on the protected side (away from the flame) reaches 120 degrees F., the test is stopped, the time elapsed noted, and the condition of the exterior or flame resistant surface—the side in contact with the flame—evaluated. The time elapsed until a temperature of 120 degrees F. is reached on the side of the composite structure away from the flame is defined herein as the Thermal Resistance of the composite structure. To be considered satisfactory, the composite structures of the subject invention are required to have a Thermal Resistance under the Fire and Heat Resistance Test described above of at least about 25 seconds. Preferred structures have Thermal Resistances of at least 30 seconds, more preferably about 45 seconds and, for some applications, one minute or more. They must also, of course, be fire resistant and not support combustion.

The highly desirable insulating characteristics of the composite structures of this invention are believed due to the fine air cells trapped within the fiber-resin matrix. The particular fiber and resin particle sizes used together with the method of manufacture are believed responsible for the highly desirable insulation characteristics obtained while maintaining the porosity required for certain applications.

The following examples illustrate the manner in which the composite structures of the subject invention may be formed, as well as illustrating the fire and heat resistance of the structures. These examples are illustrative and the invention should not be considered as limited thereby.

EXAMPLE 1

Using the preferred method described above, a sheet of thermal insulation material, having a thickness of about 20 mils, was prepared from a mixture of about 92 percent by weight glass microfibers and 8 percent by weight (on a solids basis) of Airflex ®4500.

After drying, the resulting sheet material was treated to render it hydrophobic, oleophobic, solvent resistant and detergent resistant. The treating material used was a dilute mixture of FC-824 in water and butyl carbitol, i.e., the dilute mixture comprised 7 parts by volume water, 0.5 parts by volume of the butyl carbitol and 2.5 parts by volume of the FC-824, which was applied by spraying (alternatively, the sheet material may be saturated with the treating material) the fluorochemical treating agent onto the structure, following which it was dried at about 250 degrees F. The resulting thermal insulation sheet material had a basis weight of about 3.5 ounces per square yard.

Four layers of the resulting thermal insulating structure were then composited with a Nomex polyaramid fire resistant fabric having a caliper of about 7 mils and a basis weight of about 2 ounces per square yard. The four layers of the thermal insulation material were secured to each other and to the Nomex fabric along the edges. The composite structure was then secured to a lightweight cloth simulating a cotton T-shirt undergarment on a person wearing a garment prepared from the composite structure. The resulting structure (sample A) had a caliper or thickness of about 140 mils and was subjected to the Fire And Heat Resistance Test as described above. The results are shown in Table I below.

A second structure (sample B), substantially the same as that described above but having a caliper of about 135 mils, was similarly tested with the results shown in Table I.

TABLE I

| Sample | Outer Surface Temperature | Time to Reach 120 Degress F. on Protected Side | Observations |
| --- | --- | --- | --- |
| A | 420 Degrees F | 35 Seconds | No scorching of NOMEX fabric or thermal insula- |

TABLE I-continued

| Sample | Outer Surface Temperature | Time to Reach 120 Degress F. on Protected Side | Observations |
|---|---|---|---|
| B | 420 Degrees F | 35 Seconds | tion layers Very slight scorch of NOMEX fabric, some effect of temperature shown on thermal insulation layers. |

By comparison: Nomex fabric was composited with cotton cloth and subjected to the same test. The outer surface (Nomex fabric side) reached 450 degrees F. in the 7–8 seconds it took the inner side to reach 120 degrees F. The Nomex fabric melted and the cotton cloth inner layer simulating a cotton T-shirt undergarment was scorched.

In like manner, similar composite structures are prepared and tested using the Fire And Heat Resistance Test described above. The results are set out in Table II below.

TABLE II

| Sample | Composite Structure | Caliper (mils) | Outer Surface Temperature | Time to Reach 120 Degrees F on Protected Side | Observations |
|---|---|---|---|---|---|
| C | Same as Sample A and B but with 6 layers of thermal insulation | 170 | 490 Degrees F | 60 Seconds | No scorching of NOMEX but some on first layer of thermal insulation |
| D | same as sample C but with 8 layers of thermal insulation | 200 | 550 Degrees F | 80 Seconds | Hole burned through NOMEX; first 3 layers of thermal insulation scorched; remaining 5 layers showed very slight discoloration but no scorching |
| E | Heavy cotton cloth[1] outer layer composited with 4 layers of thermal insulation material of Sample A and lightweight cotton cloth as inner layer | 180 | 550 Degrees F | 45 Seconds | Slight charring and stiffening of outer cotton layer; first layer of thermal insulation material scorched; second layer slightly discolored |
| F | Same as Sample E but 8 layers of thermal insulation material | 210 | 605 Degrees F | 95 Seconds | Cotton fire protection layer scorched and stiffened; scorching through first 5 layers of 8 sheets of thermal insulation material. Light cotton inner layer unmarred. |
| G | Same as E but with 2 layers of thermal insulation material | 135 | 435 Degrees F | 23 Seconds | Slight charring and stiffening of outer heavy cotton cloth layer; first layer of insulation material scorched; second layer unmarred |

[1]Heavy cotton cloth used as outer fire protection layer had a caliper of 10 mils and a basis weight of about 7 ounces per square yard.

In a similar manner, other composite structures can be prepared with the requisite properties. For example, materials, such as cloth prepared from a blend of nylon and cotton, can be used as the outer fire resistant layer.

From the results set out above, it is apparent that the composite structures of the subject invention can provide significant protection against both fire and heat. In the case of Sample G, however, the use of two layers of the thermal insulating material was insufficient to reach the minimum time of 25 seconds considered sufficient for purposes of this invention.

The combination of both fire and thermal protection, while maintaining breathability of the garment because of its porous nature, provides a structure with highly desirble properties in a wide variety of applications.

INDUSTRIAL APPLICABILITY

The composite structures of the present invention may be used in any application where a flexible or pliant, fire and heat resistant material is required. The composite structures of this invention are particularly suited for manufacturing fire and heat resistant garments for race car drivers, fire fighters, jet fighter pilots and the like. The composite structures of the present invention will also find use in the manufacture of articles such as ironing board covers and fire and heat resistant gloves.

I claim:

1. A porous, flexible and pliant fire and heat resistant composite structure comprising:
    at least one outer layer of a fire resistant fabric and one or more layers of a heat resistant material comprised of a mixture of from 50 to about 94 percent by weight of inorganic microfibers and from about 50 to about 6 percent by weight of a heat resistant binding agent, said composite structure having a Thermal Resistance of at least about 25 seconds.

2. The composite structure of claim 1 wherein said inorganic microfibers are comprised of a mixture of glass and potassium titanate.

3. The composite structure of claim 1 wherein said inorganic microfibers are comprised of glass.

4. The composite structure of claim 3 wherein said glass fibers comprise from about 70 to about 92 percent by weight of said mixture and said binding agent comprises from about 30 to about 8 percent by weight of said mixture.

5. The composite structure of claim 3 wherein said glass microfibers have diameters in the range of 0.4 to about 4.0 micrometers, average lengths in the range of from about 50 to about 3,000 micrometers and aspect ratios in the range of from about 20:1 to about 1,000:1.

6. The composite structure of claim 5 wherein said glass microfibers have diameters in the range of from about 0.5 to about 2.0 micrometers.

7. The composite structure of claim 3 wherein said binding agent comprises a heteropolymer formed at least in part from a vinyl chloride monomer.

8. The composite structure of claim 7 wherein said heteropolymer is an ethylene vinyl chloride acrylamide terpolymer.

9. The composite material of claim 3 wherein said fire resistant fabric comprises an aromatic polyamide fabric produced from yarns formed by combining one of the meta- or para-isomers of phenylenediamine with one of the meta- or para-isomers of phthaloyl chloride.

10. The composite material of claim 3 wherein said fire resistant fabric is a heavy cotton fabric having a basis weight of from about 2 to about 10 ounces per square yard.

11. The composite structure of claim 3 wherein said heat resistant material is present in the form of two or more layers, each having a thickness in the range of from about 8 to about 30 mils.

12. The composite structure of claim 11 wherein said heat resistant material is present in the form of four or more layers.

13. The composite structure of claim 12 wherein said outer layer has a thickness of from about 10 to about 20 mils.

14. A heat and fire resistant garment comprised of the fire and heat resistant composite structure of claim 3.

15. The composite structure of claim 1 wherein said heat resistant material has been treated to render it hydrophobic, oleophobic, solvent resistant and detergent resistant.

16. A heat and fire resistant garment comprised of the fire and heat resistant composite structure of claim 1.

17. A porous, flexible and pliant fire and heat resistant composite structure comprising:
    at least one outer layer of a fire resistant fabric and one or more layers of a heat resistant material comprised of a mixture of from about 50 to about 94 percent by weight of glass microfibers and from about 50 to about 6 percent by weight of a heat resistant binding agent, said composite structure having a Thermal Resistance of at least about 25 seconds, a porosity of from about 0.01 to about 20 cubic feet of air per square foot of surface area per minute at a pressure of 0.5 inches WC and a temperature of 50 degrees C., and an overall thickness of from about 30 to about 100 mils.

18. The composite structure of claim 17 wherein said microfibers are present in said mixture in an amount of from about 70 to about 92 percent by weight of said mixture, said heat resistant binding agent comprises a heteropolymer formed at least in part from a vinyl chloride monomer and is present in said mixture in an amount of from about 30 to about 8 percent by weight of said mixture, said heat resistant material is comprised of two or more layers, each having a thickness in the range of from about 8 to about 30 mils, said fire resistant fabric comprises a heavy cotton fabric having a basis weight of from about 2 to about 10 ounces per square yard and said composite structure has a Thermal Resistance of at least about 30 seconds.

19. A heat and fire resistant garment comprised of the fire and heat resistant composite structure of claim 18.

20. A heat and fire resistant garment comprised of the fire and heat resistant composite structure of claim 17.

* * * * *